United States Patent [19]

Torok

[11] 4,003,451
[45] Jan. 18, 1977

[54] LOW NOISE BRAKE SHOE FOR TRACK RETARDER

[75] Inventor: Harold Franklin Torok, Chattanooga, Tenn.

[73] Assignee: QIV Incorporated, Chattanooga, Tenn.

[22] Filed: June 30, 1975

[21] Appl. No.: 591,288

[52] U.S. Cl. .............................. 188/62; 75/123 J; 75/123 L; 188/250 B; 188/250 E; 188/251 M; 192/30 V; 192/107 M
[51] Int. Cl.² .................................... B61K 7/04
[58] Field of Search ......... 188/1 B, 62, 730, 250 B, 188/251 M, 73.5, 250 R, 250 H, 250 E; 192/107 M, 30 V; 75/123 CB, 125, 123 J, 123 L; 148/35; 308/DIG. 8

[56] References Cited
UNITED STATES PATENTS

| 1,647,575 | 11/1927 | Nelson | 188/250 R |
| 1,691,010 | 11/1928 | Howe | 188/62 X |
| 1,942,802 | 1/1934 | Brown | 188/62 |
| 2,273,481 | 2/1942 | Bone | 188/62 |
| 3,005,736 | 10/1961 | Peras | 75/123 CB X |
| 3,460,652 | 8/1969 | Botterill | 188/73.5 |
| 3,490,563 | 1/1970 | Hahn | 188/73.5 |
| 3,600,238 | 8/1971 | Ravenel | 148/35 X |
| 3,716,114 | 2/1973 | Beck | 188/62 |
| 3,768,600 | 10/1973 | Beck | 188/62 |

FOREIGN PATENTS OR APPLICATIONS

| A51,856 | 2/1943 | France | 188/62 |
| 463,565 | 11/1968 | Switzerland | 188/250 B |

Primary Examiner—George E. A. Halvosa
Attorney, Agent, or Firm—Joseph C. Redmond, Jr.

[57] ABSTRACT

Noise from track retarders is significantly reduced by a brake shoe which dampens vibrations as continuous braking action of a wheel occurs. The brake shoe is adapted to have selectively variable brake surface configurations which contribute to reduced vibration. A special metal alloy, typically a flake-graphite bearing iron with vibration suppression characteristics lubricates the braking surface and lessens wheel oscillations during braking. The lubrication also contributes to uniform surface temperatures along the braking surface which lessens the tendency for the braking to fade. The brake shoe is basically a self-lubricated surface of variable contact area configuration.

10 Claims, 14 Drawing Figures

LOW NOISE BRAKE SHOE FOR TRACK RETARDER

BACKGROUND OF THE INVENTION a. Field of the Invention

The invention relates to track retarders. More particularly, the invention relates to brake shoes associated with track retarders and the like.

b. Description of Prior Art

Railcar or track retarding mechanisms are used to slow down or stop the movement of cars as they are switched from track to track in the course of classifying or assembling trains in freight yards. Retarders are generally in the nature of mechanically positioned, spring-loaded opposed friction surfaces which rub against the vertical wheel surfaces of railcars as they pass between the gripping surfaces. Friction thus generated between the wheel and the gripping surfaces acts to remove kinetic energy from the railcar, which in turn will reduce its speed of movement.

Often a loud squealing or shrieking noise is generated when the friction surfaces are pressed against the rotating wheels; the noise thus produced is most often in the frequency range of 2200 to 3400 Hertz with an amplitude (or level) which may rise to 130dB(A) at distances of 50 feet or more.

The retarders are equipped with replaceable brake shoes which are brought to bear against the sides of each wheel (although sometimes only the wheels on one side of the railcar will be so affected). The braking pressure may vary from a few hundred pounds to several tons, depending upon the amount of energy which is to be removed from the railcar. Most often the brake shoes are of rolled or cast steel to possess sufficient strength to withstand the braking action.

Positioning of the brake shoes may be accomplished by a motor-driven gearbox or lever arrangement, hydraulic rams or pneumatic cylinders. Contact between the moving wheels and the stationary brake shoe results in a "stick-slip" condition which in many cases causes harmonic vibrations in the plate or center disc area of the railcar wheels. It is this vibration which produces the objectionable screeching sound previously described. Most of this stick-slip phenomena occurs between the inside of the wheels and the inside brake shoes. (Inside refers to those brake shoes between the rails as opposed to those brake shoes which are positioned outside of the rails.)

The prior art has been directed toward special braking materials to suppress noise levels from track retarder operation. U.S. Pat. No. 3,321,048 describes a ductile iron as a braking material. U.S. Pat. No. 3,716,114 describes a non-metallic noise suppressant brake material. Material selection, however, does not per se address all parameters involved in noise generation from track retarder operation. A brake shoe that addresses additional parameters beyond noise suppression should contribute to improved track retarder operation from an environmental, operational and safety standpoint.

SUMMARY OF INVENTION

An object of the invention is a track retarder that achieves significantly reduced noise levels in braking operations.

Another object is a brake shoe for track retarders that has minimum size, a long life and higher braking force than conventional brake shoes.

Another object is a brake shoe that is easily replaceable and low in cost relative to conventional brake shoes.

In an illustrative embodiment, a track retarder apparatus includes a pair of opposed, elongated, spring-loaded jaws and replaceable brake shoes suitably attached to the jaw. The apparatus is suitably operated to bring the brake shoes into engagement with a rotating metallic wheel passing therebetween. The braking surface is continuously applied to the wheel, but selectively variable to dampen the generation of vibrations or screech noise in the wheel from the rubbing action. The shape of the brake shoe is selected to develop higher braking force than that for rolled or cast steel brake shoes. The compositions of the brake shoes is a metal alloy that possesses a lubricating quality when engaged in braking. The metal alloy possesses (1) good inherent vibration dampening characteristics, (2) a high heat transfer capability which promotes uniform surface temperature, and (3) a high coefficient of friction during braking.

A feature of the invention is a brake shoe having a brake contact area of varying width which produces non-homogenous braking and achieves reduced oscillations emanating from the rubbing action during braking.

Another feature is a brake shoe having a physical configuration that includes a structural or reinforcing section that contributes to a high strength and reduced oscillations during braking.

Another feature is a brake shoe formed from a metal alloy, typically a special flake-graphite bearing iron which has (1) a high natural lubricity to lessen oscillations in braking, (2) a high inherent vibration suppression characteristic, and (3) a high heat transfer capability that promotes a more uniform surface temperature that lessens the tendency for the brakes to fade with heat buildup from friction.

BRIEF DESCRIPTION OF THE DRAWING

These and other objects, features and advantages will be more fully understood from the following detailed specifications taken in conjunction with the appended drawing in which:

FIGS. 2A, B, C, and D are front, end, top and bottom views, respectively, of a brake shoe employing the principles of the present invention for use in the apparatus of FIGS. 1A and B and the like.

FIGS. 4A, B, C, and D are front, end, top and bottom views of still another shoe for use in the apparatus of FIGS. 1A and 1B and the like.

DESCRIPTION OF PREFERRED EMBODIMENT

Figure 1A:
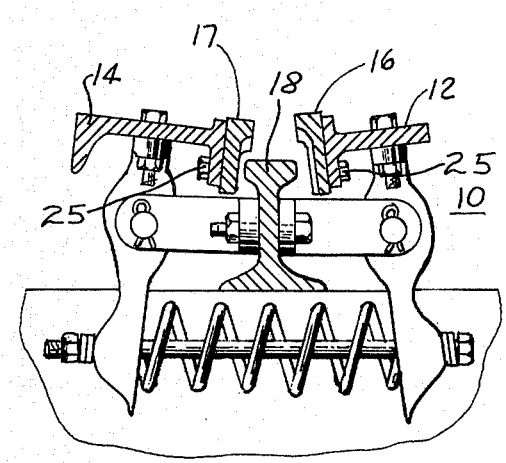
FIGS. 1A and B are cross-sectional views of prior art track retarders to which the invention is applicable.
Figure 1B:
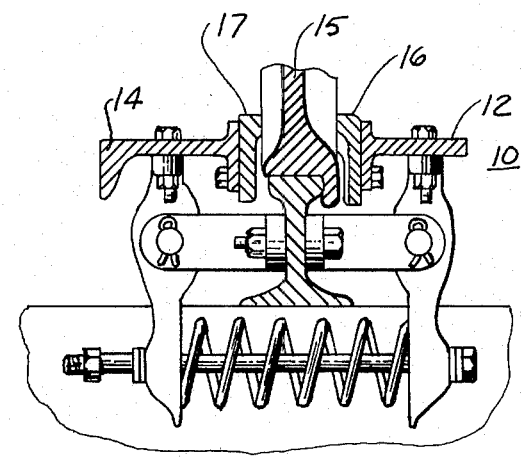

FIGS. 1A and 1B are illustrative of the prior art track retarders shown in U.S. Pat. No. 3,716,114. The apparatus 10 has been modified to include improved low noise brake shoes of the present invention. The apparatus 10 includes an inner jaw 12 and outer jaw 14, which are spring-loaded for opposed rubbing action to a wheel 15 passing therebetween on a rail 18. It should be understood that there are other retarder apparatus which may be adapted to include a pair of brake shoes 16 and 17 of the present invention. For purposes of identification the shoe 16 is designated as an inner brake shoe whereas the shoe 7 is designated as the outer brake shoe.

Figure 2C:
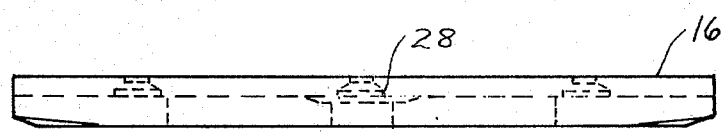
Figure 2A:
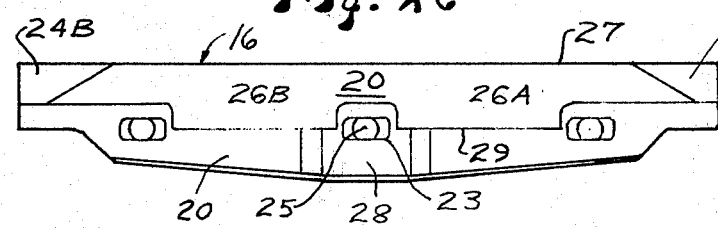

In FIG. 2A, inner shoe 16 has a braking section 20 and a strength reinforcing section 22. Suitable openings 23 are formed in the section 22 to permit appropriate fasteners 25 (FIGS. 1A, 1B), for attaching and easily replacing the shoe 16 to the jaw 12. In one form, bolted connections 25 may be employed which simplifies installation of the shoe. In contrast, installation means for prior art brake shoes employ welding, riveting or other semipermanent and complicated installation techniques.

Section 20 presents a selectively variable braking surface to the passing wheel 15 (FIG. 1B). The braking surface is carefully designed to provide a varying contact surface, as will be explained hereinafter. Tapered entry and departure areas 24A and 24B, respectively, together with symmetrically shaped braking areas 26A and 26B, formed about the center line of the shoe 16, comprise the braking section 20. The areas 24A and B are shaped to linearly vary the braking force against the passing wheel. Stated another way, the brake shoe 16 has a first edge 27 and a second edge 29. The first edge 27 lies in a common plane. The second edge 29 lies in stepped planes which are parallel to the common plane. The areas 26A and B non-linearly increase and vary the braking force. Graphically plotting brake area against member length describes a combination of linear and non-linear geometries for areas defined by first order and higher order equations, respectively. The selectively variable braking sections produces a planar, undulating and non-homogeneous or non-uniform, uninterrupted or continuous contact with the passing wheel. The carefully designed varying areas cause a disruption and dampening of vibrations in the shoe which reduces the oscillation in the wheel from which the screeching noise emanates. Field tests have established that the present shoe restricts the noise emissions to 100dB(A) or less whereas steel brake shoes often produce approximately 130dB(A) as measured 50 feet from the source. Noise levels of 130dB(A), in some instances, exceed the human threshold of pain. The significantly reduced noise level of the present invention improves the working conditions for railroad personnel as well as the environmental conditions for residents adjacent to freight classification and marshalling yards.

Figure 2B:
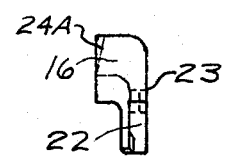
Figure 2D:
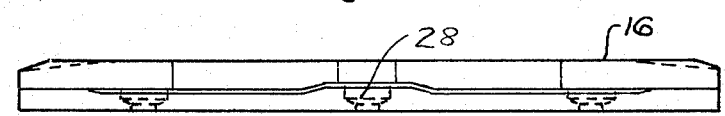

The reinforcing section 22 extends from and is recessed relative to the braking plane, as shown in FIG. 2B. In one form, the section 22 is "fishbelleyed" shaped to increase and exceed the strength of the shoes formed from cast or rolled steel. The increased strength in the present shoe permits greater braking force to be developed than that for steel shoes. Field tests indicate that inner shoes of the present invention develop about 6 to 8% greater braking force than that for corresponding steel shoes. Also, the increased strength permits a longer life than that for corresponding steel shoes. Field tests further indicate that the present shoes have a service life of up to 15% longer than that for corresponding steel shoes. Finally, the increased strength contributes to reduction and dampening of vibrations during braking action thereby aiding in lowering the screech noise generated in the braking action.

FIGS. 2C and D show an area 28 of increased thickness about the center line. The area 28 enhances the strength at the center plane to withstand the maximum bending moments which are generated at the center line during the braking action.

The shoe 16 is formed from a metal alloy, typically a special flake-graphite bearing iron which has more natural lubricity than cast steel or ductile iron. The lubricating qualities of the alloy contribute to reduced oscillations in the wheel and lowered screeching during braking action. The proven inherent vibration dampening characteristics of the special flake-graphite bearing alloy further contributes to reduced oscillations. Metal alloy compositions found to possess the required lubricity and vibration dampening characteristics for the present invention are as follows:

| MATERIAL | PERCENTAGE RANGE |
| --- | --- |
| Carbon | 3.20 – 3.40% |
| Silicon | 2.05 – 2.225% |
| Copper | 0.75 – 1.00% |
| Manganese | 0.60 – 0.80% |
| Molybdenum | 0.40 – 0.60% |
| Phosphorous | 0.08% Maximum |
| Sulphur | 0.025 – 0.045% |
| Iron | 91.85 – 92.97% |

The graphite bearing alloys also possess a high heat transfer capability which promotes uniform surface temperatures across the shoe 16 during braking. The uniform surface temperatures retains a high coefficient of friction across the braking surface during braking action. Inner brake shoes employing the principles of the present invention have a reduced tendency to "fade" or diminish in braking strengths as heat buildup occurs.

Figure 3C:
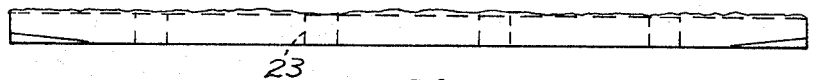
FIGS. 3A, B, C, and D are front, end, top and bottom views of another brake shoe which practices the principle of the present invention.
Figure 3A:
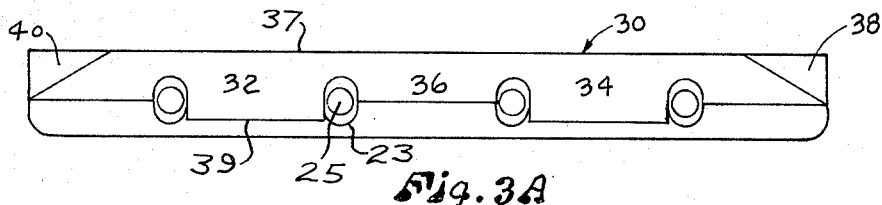
Figure 3B:
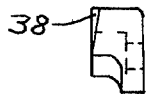
Figure 3D:
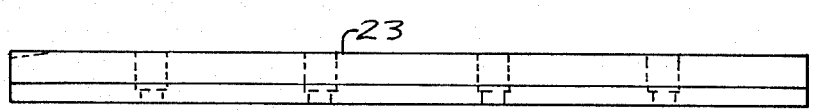

FIG. 3A shows another inner brake shoe 30 which practices the principles of the present invention. The shoe 30 has a different physical configuration than that for the shoe 16 but the same ability to lower screeching noise during braking. Three braking areas 32, 34 and 36 and tapered areas 38, 40 for entry and departure are included in the shoe 30 between a planar edge 37 and an edge 39 which lies in stepped planes parallel to the planar edge. Braking areas 32 and 34 are symmetrically and variably shaped about the connecting braking area 36. The increased braking length extends the lifetime of the shoe by lowering the braking force per unit area. The structural thickness of the shoe 30 is thickened relative to the shoe 16, as shown in FIG. 3B. The thickened shape develops a strength equal to steel without a reinforcing section 20 as in FIG. 2A.

FIGS. 3C and D show other details of the shoe 30 which is also cast in metal alloys described in conjunction with FIGS. 2A and B.

Figure 4C:
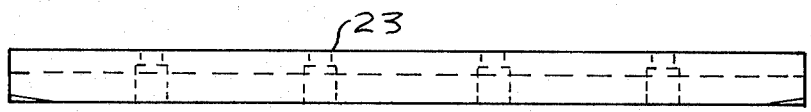
Figure 4A:
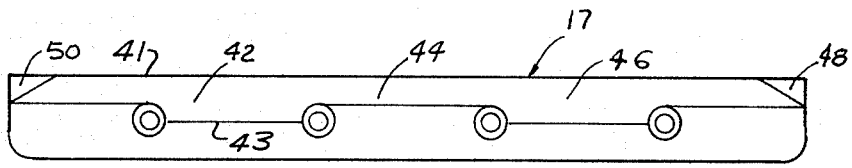
Figure 4B:
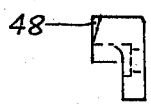
Figure 4D:
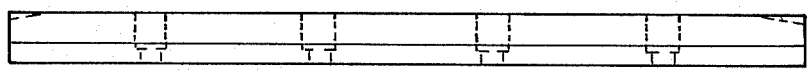

The outside brake shoe 17 attached to the jaw 14 (see FIGS. 1A and B) may be standard rolled cast steel with a physical configuration shown in FIGS. 4A, B, C and D. The shoe length is selected to be the same as that for the inner shoe. Essentially, the outer shoe 17 has a configuration substantially the same as that shown in FIGS. 3A, B, C and D including a planar edge 41 and an edge 43 which lies in stepped planes parallel to the planar edge. The width of the braking section 42, 44 and 46 is about half that shown in FIGS. 3A and B. Likewise, the tapered areas 48 and 50 are less than those shown in FIGS. 3A and B. Most noise generated in track retarder operations originates from the inner shoe. In those instances, however, where noise is generated from the outside shoe, in addition to the inner shoe, the embodiment in FIGS. 4A, B, C and D has been found to have a preferred physical configuration to reduce noise emissions generated during braking action, particularly when fabricated in graphite bearing alloys.

The length, height and width of the brake shoes 16 and 17 vary according to the energy to be removed from the wheels. Typically, the shoe dimensions in FIGS. 2A and B are 32 ½ inches long, 5 ¼ inches high and 2 ⅛ inches wide. In FIGS. 3A and B the same dimensions are 37 ¼ inches long, 3 7/8 inches high, and 2 ¼ inches wide. The same dimensions in FIGS. 4A and B correspond to those in FIGS. 3A and B.

It is to be understood that the above embodiments are only illustrative of the principles of the invention. Numerous other embodiments may be devised by those skilled in the art without departing from the spirit and scope of the present invention.

What is claimed is:
1. A brake shoe for track retarder apparatus comprising:
   a. An elongated member that may be suitably attached to a jaw in a track retarder apparatus, and
   b. A continuous braking surface included in the elongated member, the braking surface comprising a series of discrete variable widths along the length of the member having a first and a second edge, the first edge lying in a common plane, the second edge lying in stepped planes parallel to said common plane wherein said discrete variable widths reduce noise generation in the track retarder apparatus.

2. The invention of claim 1 wherein the elongated member is formed of a metal alloy that provides high inherent dampening of vibrations.

3. The invention of claim 1 wherein the metal alloy is a composition comprising elements in the following ranges: Carbon 3.2 to 3.4%, Silicon 2.05 to 2.25%; Copper 0.75 to 1.00%; Manganese 0.6 to 0.8%; Molybdenum 0.4 to 0.6%; Phosphorous 0.08% maximum; Sulphur 0.025 to 0.045%; and Iron 91.85 to 92.975%.

4. The brake shoe of claim 1 in combination with track retarder apparatus for a railcar having metallic wheels, the braking surface having a continuous contact area of varying width, adjacent widths in the second edge being in alternate planes along the length of the member to dampen the generation of noise emanating from a wheel due to retardation.

5. The brake shoe of claim 4 wherein the brake surface along the length of the member disrupts vibrations in a wheel due to retardation thereby reducing noise emanating therefrom.

6. The brake shoe of claim 5 being of alternating widths along the length thereof to provide continuous but not uniform braking force to a wheel during retardation thereby to reduce noise emanating from the retardation.

7. The invention of claim 4 including a second brake shoe attached to a different jaw in the track retarder apparatus, the second brake shoe comprising a series of discrete variable widths along the length of a second member having a first edge in a common plane and a second edge in stepped planes parallel to said common plane.

8. The invention in clain 7 wherein the second brake shoe is an outside brake shoe formed of a metal alloy and having a reduced braking surface relative to an inside brake shoe.

9. The invention of claim 1 wherein the elongated member includes a reinforcing section to increase the strength of the member.

10. The invention of claim 1 wherein the braking surface of discrete variable widths comprises a plurality of continuous areas defined by first and higher order equations.

* * * * *